United States Patent
Henry

(10) Patent No.: US 10,390,581 B1
(45) Date of Patent: Aug. 27, 2019

(54) RADIO FREQUENCY HEAD TRACKER

(71) Applicant: Rockwell Collins, Inc., Cedar Rapids, IA (US)

(72) Inventor: Daniel J. Henry, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/260,527

(22) Filed: Jan. 29, 2019

(51) Int. Cl.
| | |
|---|---|
| *G06F 3/01* | (2006.01) |
| *A42B 3/30* | (2006.01) |
| *G06F 9/44* | (2018.01) |
| *H01Q 1/22* | (2006.01) |

(52) U.S. Cl.
CPC ............... *A42B 3/30* (2013.01); *G06F 3/012* (2013.01); *G06F 9/44* (2013.01); *H01Q 1/22* (2013.01)

(58) Field of Classification Search
CPC .......... G06F 3/012; G06F 3/011; G06F 3/017; G06F 3/0304; G06F 3/0346; G06F 3/013; G06F 9/44; H04L 67/12; H04N 5/23238; A42B 3/0433; A42B 3/30; H01Q 1/22
USPC ................... 455/575.2; 345/8, 633
See application file for complete search history.

(56) References Cited

U.S. PATENT DOCUMENTS

| | | | | |
|---|---|---|---|---|
| 6,377,401 B1 * | 4/2002 | Bartlett | ................... | F41G 3/225 345/8 |
| 7,046,215 B1 * | 5/2006 | Bartlett | ................... | G01S 5/163 345/8 |
| 8,902,085 B1 * | 12/2014 | Ray | ........................ | F41H 11/02 340/945 |
| 9,811,908 B2 * | 11/2017 | Raghoebardajal | ... | G02B 27/017 |
| 9,874,931 B1 * | 1/2018 | Koenck | ................... | G06F 3/012 |
| 10,067,560 B1 * | 9/2018 | Koenck | ................... | G06F 3/012 |
| 2002/0024675 A1 * | 2/2002 | Foxlin | ................. | G02B 27/017 356/620 |

(Continued)

OTHER PUBLICATIONS

FlightTracker: A Novel Optical/Inertial Tracker for Cockpit Enhanced Vision, Eric Foxlin, Yury Altshuler, Leonid Naimark and Mike Harrington, Proceedings of the Third IEEE and ACM International Symposium on Mixed and Augmented Reality; (Year: 2004).*

(Continued)

*Primary Examiner* — Nathan S Taylor
(74) *Attorney, Agent, or Firm* — Angel N. Gerdzhikov; Donna P. Suchy; Daniel M. Barbieri

(57) ABSTRACT

A head-tracking system utilizing radio frequency (RF) transmitters and receivers. RF fiducials are disposed on a helmet and a constellation of receivers receives one or more RF carriers with defined pulse frequencies. Measured time delays are used to produce a head pose. Alternatively, phase shifting is measured to determine the location of each RF fiducial within a single wavelength. In some embodiments, multiple frequency ranges may be used to define a coarse location via phase shifting within a long wavelength RF carrier and a fine location via phase shifting within a short wavelength RF carrier. In a further aspect, polarization and amplitude measurements in conjunction with a known peak RF transmitter amplitude may be used to determine a receiver's relative position with respect to the RF transmitter. GPS location methodologies, spread spectrum frequency hopping, and encryption may also be utilized.

17 Claims, 5 Drawing Sheets

(56) References Cited

U.S. PATENT DOCUMENTS

| | | | |
|---|---|---|---|
| 2002/0194914 A1* | 12/2002 | Foxlin | A61B 5/1114 |
| | | | 73/514.01 |
| 2008/0048931 A1* | 2/2008 | Ben-Ari | A42B 3/0433 |
| | | | 345/8 |
| 2009/0147993 A1* | 6/2009 | Hoffmann | G02B 27/0093 |
| | | | 382/103 |
| 2009/0237355 A1* | 9/2009 | Orion | G06F 3/012 |
| | | | 345/156 |
| 2010/0231705 A1* | 9/2010 | Yahav | G02B 27/01 |
| | | | 348/115 |
| 2013/0305437 A1* | 11/2013 | Weller | A42B 3/0406 |
| | | | 2/422 |
| 2015/0317838 A1* | 11/2015 | Foxlin | G02B 27/06 |
| | | | 345/633 |
| 2018/0040162 A1* | 2/2018 | Donnelly | G06T 19/006 |
| 2018/0040163 A1* | 2/2018 | Donnelly | G06T 19/006 |
| 2018/0231404 A1* | 8/2018 | Kitain | G01D 11/30 |
| 2019/0057612 A1* | 2/2019 | Schupp | G08G 5/04 |

OTHER PUBLICATIONS

Head tracking relative to a moving vehicle or simulator platform using differential inertial sensors, Eric M. Foxlin, Proc. SPIE 4021, Helmet- and Head-Mounted Displays V, Jun. 23, 2000 (Year: 2000).*

* cited by examiner

RADIO FREQUENCY HEAD TRACKER

BACKGROUND

Head-tracking is challenging for military and commercial applications such as for aircraft pilots, virtual reality, etc. due to accuracy and update rate. Existing technologies include magnetic tracking and optical tracking, both active and passive. Many applications have requirements that are not currently satisfied by the existing solutions, including full spherical coverage, high angular/positional accuracy within the entire size of a corresponding enclosed volume, and high update rate.

SUMMARY

In one aspect, embodiments of the inventive concepts disclosed herein are directed to a head-tracking system utilizing radio frequency (RF) transmitters and receivers. RF fiducials are disposed on a helmet. A constellation of receivers receives one or more RF carriers with defined frequencies, and the measured time delays are used to produce a head pose. Alternatively, phase detection is measured to determine the location of each RF fiducial within a single wavelength. In some embodiments, multiple frequency ranges may be used to define a coarse location via phase detection within a long wavelength RF carrier and a fine location via phase detection within a short wavelength RF carrier.

In a further aspect, polarization and amplitude measurements in conjunction with a known peak RF transmitter amplitude may be used to determine a receiver's relative position with respect to the RF transmitter.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
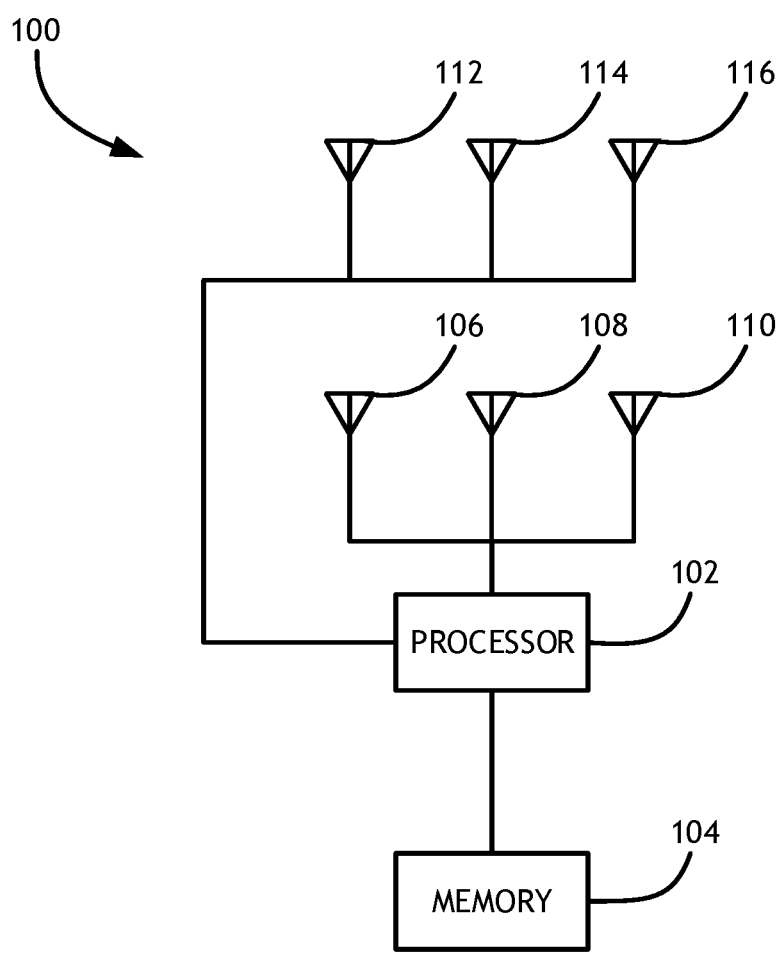
FIG. 1 shows a block diagram of a computer system for implementing exemplary embodiments of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a head-tracking system utilizing radio frequency (RF) transmitters and receivers with RF fiducials are disposed on a helmet and a constellation of receivers. Measured time delays, phase shifts, or amplitude changes are measured to determine the location of each RF fiducial.

Referring to FIG. 1, a block diagram of a computer system 100 for implementing exemplary embodiments of the inventive concepts disclosed herein is shown. The system 100 includes a processor 102, memory 104 connected to the processor 102 for storing processor executable code, and one or more RF receiver antennas 106, 108, 110 connected to the processor 102. The processor 102, determines a pose based on signals from a plurality of RF fiducials 112, 114, 116 disposed at known locations, as described more fully herein.

In at least one embodiment, the processor 102 calculates the pose based on a phase shift of signals from the RF fiducials 112, 114, 116 due to changes in the distance from the RF fiducials 112, 114, 116 to corresponding RF receiver antennas 106, 108, 110. In another embodiment, the pose is based on a time delay in pulses from the RF fiducials 112, 114, 116. In another embodiment, the pose is based on a change in a maximum amplitude due to polarization and change in orientation of the signals from the RF fiducials 112, 114, 116.

It will be appreciated that in specific embodiments, the RF fiducials 112, 114, 116 may be disposed on a head worn appliance, such as a helmet, and the RF receiver antennas 106, 108, 110 may be disposed at known locations within the environment, such as a cockpit. In other embodiments, the RF receiver antennas 106, 108, 110 may be disposed on the head worn appliance, and the RF fiducials 112, 114, 116 may be disposed at known locations within the environment.

Figure 2:
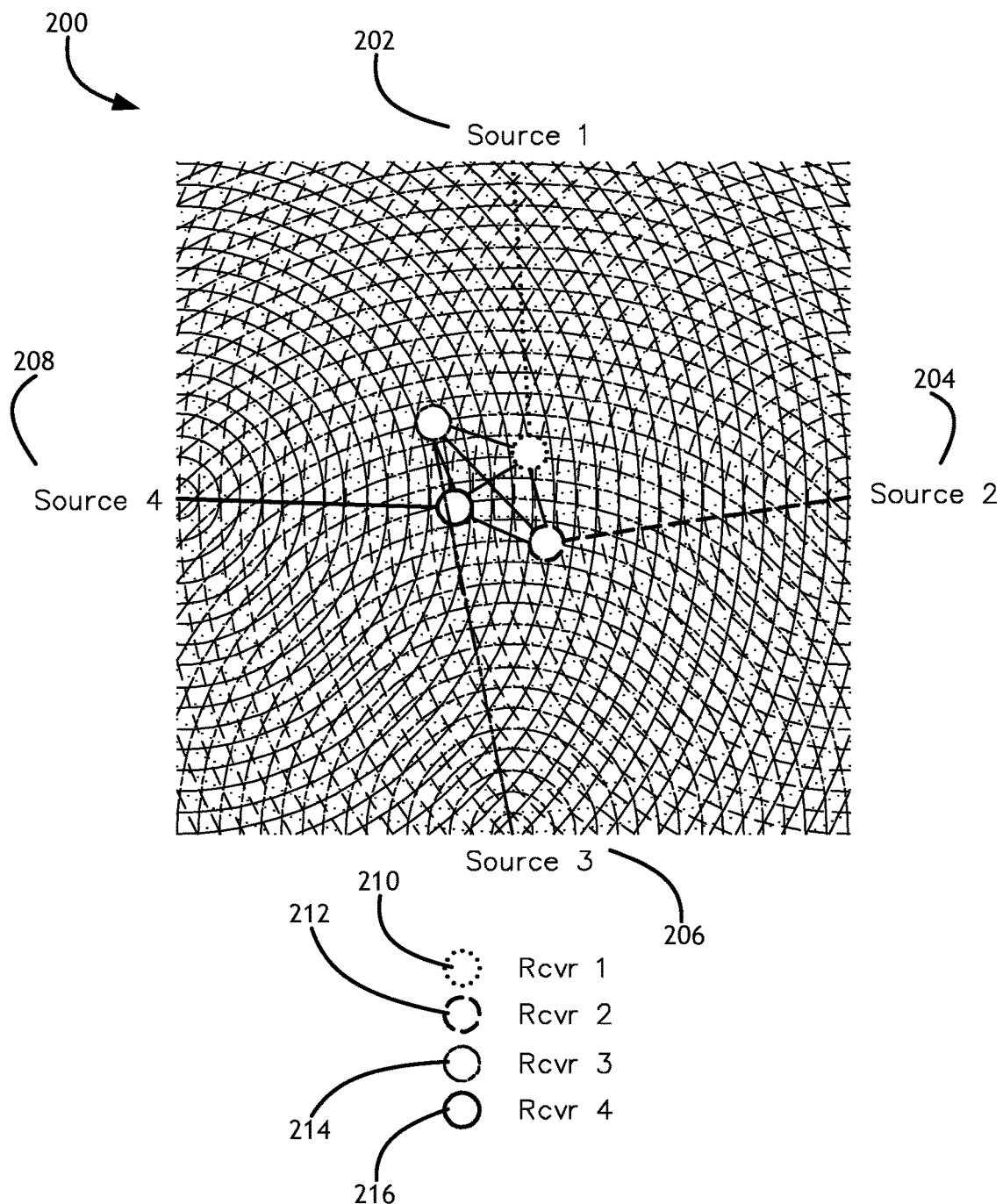
FIG. 2 shows a representation of RF signals, receivers, and corresponding waveforms.

Referring to FIG. 2, a representation of RF signals 200, receivers 210, 212, 214, 216, and corresponding waveforms is shown. In one embodiment, a system includes one or more RF sources 202, 204, 206, 208 and one or more RF receivers 210, 212, 214, 216. Either the RF sources 202, 204, 206, 208 or the RF receivers 210, 212, 214, 216 comprise fiducials disposed on a helmet while the others comprise fixed elements within the operating environment. Exemplary embodiments described here will generally describe the RF sources 202, 204, 206, 208 as the helmet mounted fiducials.

In at least one embodiment, RF sources 202, 204, 206, 208 and RF receivers 210, 212, 214, 216 are configured as operating pairs (first RF source-receiver pair 202, 210, second RF source-receiver pair 204, 212, third RF source-receiver pair 206, 214, and fourth RF source-receiver pair 208, 216). Such configuration may allow the system to avoid interference and allow for certain error checking algorithms. Alternatively, each RF receiver 210, 212, 214, 216 may receive signals from each RF sources 202, 204, 206, 208 and utilize the redundant location calculations to improve accuracy.

The RF sources 202, 204, 206, 208 may utilize a range of frequencies depending on electromagnetic interference, environmental constraints, and tracking accuracy requirements. In some embodiments, the frequencies utilized by the RF sources 202, 204, 206, 208 may define carrier wave frequencies for signal pulses. Each RF source 202, 204, 206, 208 produces a signal pulse associated with a time-code; one or more of the RF receivers 210, 212, 214, 216 then receives the pulse at a later time-code. The difference between the time-codes corresponds to a measure of the distance from the RF source 202, 204, 206, 208 to the RF receiver 210, 212, 214, 216. In at least one embodiment, a single RF source 202, 204, 206, 208 may produce a pulse and each RF receiver 210, 212, 214, 216 corresponds to a different time-code such that a calculated relative location of each RF receiver 210, 212, 214, 216 define a unique head pose. In at least one embodiment, each of a plurality of RF sources 202, 204, 206, 208 produces a distinct pulse such that one or more RF receivers 210, 212, 214, 216 may differentiate between RF sources 202, 204, 206, 208 when calculating a unique head pose based on time-code differences. Pulse rise time should be chosen to minimize error due to rise time. Free space signal propagation is approximately one foot per nanosecond so signal sample rate determines spatial accuracy. For example, one nanosecond sampling produces positional accuracy of 304.8 millimeters (12 inches), 100 picosecond sampling produces positional accuracy of 30.48 millimeters (1.2 inches), and 10 picosecond sampling produces positional accuracy of 3.05 millimeters (0.12 inches). Angles are derived from the positions of multiple fiducials.

In at least one embodiment, the RF sources 202, 204, 206, 208 may produce sinusoidal waves. In such embodiments, phase or amplitude comparison may be used to determine the location of the RF receivers 210, 212, 214, 216 with respect to a single wavelength generated by the RF sources 202, 204, 206, 208. In such embodiments, the frequencies utilized by the RF sources 202, 204, 206, 208 should be selected such that a single wavelength corresponds to the dimension of the operating environment. Wavelengths of signals must be at least as large as the maximum fiducial offset from the origin. Shorter wavelengths could produce ambiguity for calculations based on phase or amplitude.

For example, for a 306-millimeter maximum offset, a frequency of no more than 980 MHz may be used; for a 457-millimeter maximum offset, a frequency of no more than 656 MHz may be used; and for a 915-millimeter maximum offset, a frequency of no more than 328 MHz may be used.

In at least one embodiment, a phase comparator compares the phase difference between a known path sinusoid and the detected sinusoid from each RF sources 202, 204, 206, 208 to determine spatial offset between the RF source 202, 204, 206, 208 and RF receiver 210, 212, 214, 216. Phase discrimination dictates the accuracy of the position measurement. For example, a 5° resolution requires $1/72$ of a wavelength phase discrimination, 10° resolution requires $1/36$ of a wavelength, 20° resolution requires $1/18$ of a wavelength, and 45° resolution requires $1/8$ of a wavelength. In one exemplary embodiment, in an environment where a head pose may potentially be as much as 457 millimeters from an origin (approximately 18 inches), a frequency of 656 MHz may be used with phase comparators providing 10° phase resolution, giving a positional accuracy of:

$$457 \text{ millimeters} * (10°/360°) = 12.7 \text{ millimeters} \approx 0.5 \text{ inches}$$

In at least one embodiment, the RF receivers 210, 212, 214, 216 may be used to measure signals over time to identify Doppler shift indicative of relative movement of the RF receivers 210, 212, 214, 216. Such relative movement may be used to anticipate future positions and measure rates of change of head movement. Furthermore, a combination of location tracking via phase or amplitude comparison, and Doppler shift, may be used to make anticipatory adjustments to future head pose calculations. The Doppler shift measurements may be integrated to produce a displacement or location versus time. Such measurements based on RF receivers 210, 212, 214, 216 disposed on opposing sides of the environment should yield opposite measurement which may be used to reduce noise. Angles are derived from the positions of multiple fiducials.

In at least one embodiment, time synchronized amplitude differences between a known path sinusoid and the detected sinusoid from the RF source 202, 204, 206, 208 to determine spatial offset between RF source 202, 204, 206, 208 and RF receiver 210, 212, 214, 216. Amplitude discrimination dictates the accuracy of the measurement. For example, 1% amplitude resolution requires $1/100$ of a wavelength amplitude discrimination with respect to a reference sinusoid, 5% amplitude resolution requires $1/20$ of a wavelength, and 10% amplitude resolution requires $1/10$ of a wavelength. Angles are derived from the calculated positions of multiple fiducials. In one exemplary embodiment, in an environment where a head pose may potentially be as much as 457 millimeters from an origin (approximately 18 inches), a frequency of 656 MHz may be used with 5% amplitude discrimination, giving a positional accuracy of:

457 millimeters*5%=23 millimeters≈0.9 inches

In some embodiments, differences in amplitude between the signals from the RF sources 202, 204, 206, 208 and the reference sinusoid are mapped to positions along the wavelength. In other embodiments, the amplitude of the signals from the RF sources 202, 204, 206, 208 may be compared to a peak amplitude, which corresponds to a particular point on the wavelength.

In at least one embodiment, frequency ranges may be defined according to safe human exposure within the environment. Furthermore, the possibility of interference and/or interception of the signals may be mitigated by utilizing spread spectrum and encoding/encryption techniques. Because of the limited operating environment (generally no larger than a cockpit or a Virtual Reality operating area) the RF signals are generally low power and unlikely to be detected at significant distances.

In at least one embodiment, signals may be polarized such that, as a fiducial rotates (for example, due to head rotation in a given plane), a polarization detector can detect the angle of polarization, which directly defines rotation angle. Three orthogonal fiducials can determine roll, pitch, and yaw.

Figure 3:
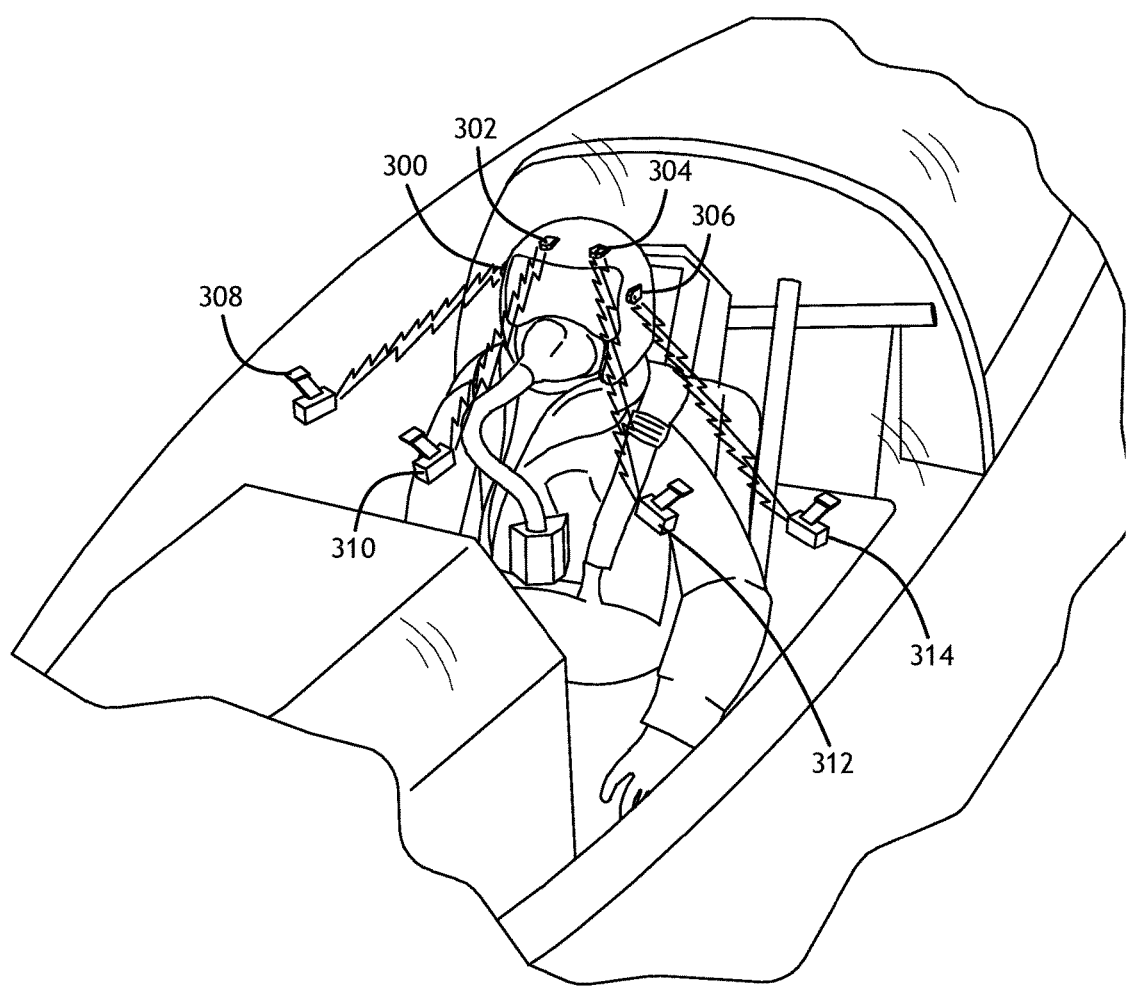
FIG. 3 shows an environmental view of a cockpit including a system according to an exemplary embodiment of the inventive concepts disclosed herein.

Referring to FIG. 3, an environmental view of a cockpit including a system according to an exemplary embodiment of the inventive concepts disclosed herein is shown. In one embodiment, a head-tracking system in an aircraft cockpit includes a plurality of RF fiducials 300, 302, 304, 306 affixed to a helmet and a plurality of RF antennas 308, 310, 312, 314 disposed at known locations within the cockpit. In some embodiments, the RF fiducials 300, 302, 304, 306 comprise RF sources. In alternative embodiments, the RF fiducials 300, 302, 304, 306 comprise RF receivers. It will be appreciated that the disposition of RF fiducials 300, 302, 304, 306 and RF antennas 308, 310, 312, 314, and the identity of RF sources and RF receivers, may be defined by the size of the antenna necessary to implement the embodiment due to the selected wavelength of the signals used.

Embodiments of the head-tracking system determine a head pose of the pilot via phase shift discrimination, amplitude discrimination, pulse timing, polarization detection, or Doppler shift integration, or some combination of those methodologies, as described herein.

Figure 4:
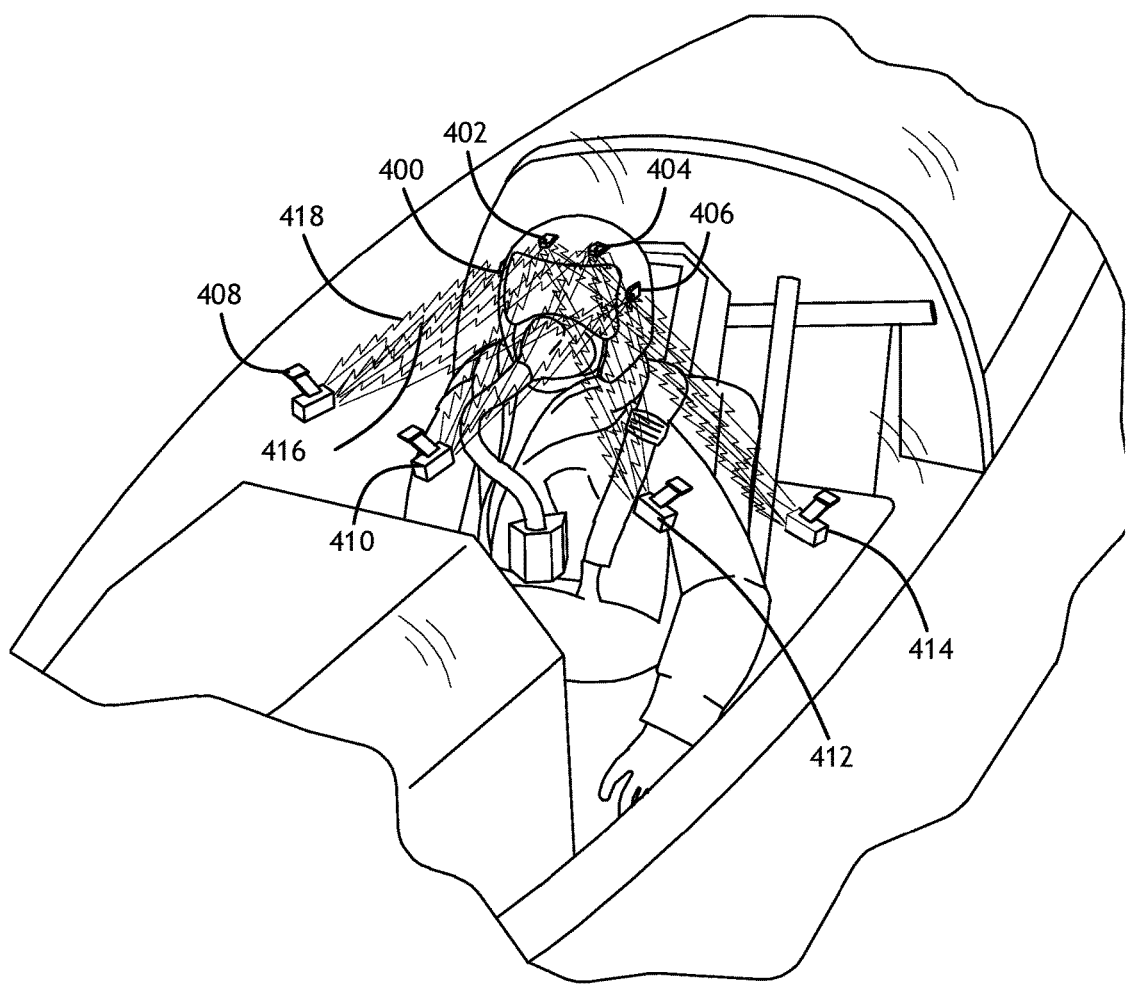
FIG. 4 shows an environmental view of a cockpit including a system according to an exemplary embodiment of the inventive concepts disclosed herein.

Referring to FIG. 4, an environmental view of a cockpit including a system according to an exemplary embodiment of the inventive concepts disclosed herein is shown. In one embodiment, a head-tracking system in an aircraft cockpit includes a plurality of RF fiducials 400, 402, 404, 406 affixed to a helmet and a plurality of RF antennas 408, 410, 412, 414 disposed at known locations within the cockpit. In some embodiments, the RF fiducials 400, 402, 404, 406 comprise RF sources. In alternative embodiments, the RF fiducials 400, 402, 404, 406 comprise RF receivers. It will be appreciated that the disposition of RF fiducials 400, 402, 404, 406 and RF antennas 408, 410, 412, 414, and the identity of RF sources and RF receivers, may be defined by the size of the antenna necessary to implement the embodiment due to the selected wavelength of the signals used.

In one embodiment, the RF fiducials 400, 402, 404, 406 affixed to a helmet and a plurality of RF antennas 408, 410, 412, 414 are configured to operate in two frequencies 416, 418. A first, relatively low frequency 416 allows a corresponding computer system to compute a gross position while a second relatively high frequency 418 allows the computer system to compute a fine position. A single high frequency 418 signal may create ambiguity because the phase shift discrimination and amplitude discrimination methodologies described herein are incapable of discriminating between positions within multiple wavelengths; for that reason, wavelengths have been described in terms of maximum possible pose offset.

In a system utilizing two frequencies 416, 418, the first frequency 416 is configured to operate in a wavelength defined by the maximum possible offset so that the computer system may determine a position within the environment without ambiguity. Then the high frequency 418 signal allows the computer system to determine a location with higher accuracy than is possible with the low frequency 416 alone. The position determined via the low frequency 416 signal eliminates ambiguity associated with the high frequency 418 signal. Conceptually, the low frequency 416 signal is used to define a "box" within which the RF fiducials 400, 402, 404, 406 are located, and the high frequency 418 signal defines a precise location within that box. For example, the low frequency 416 signal is 656 MHz (457 millimeter wavelength), with 20° phase resolution, allowing for positional accuracy of 25 millimeters; the high frequency 418 signal is 6.56 GHz (46 millimeter wavelength), 20° phase resolution then allows for positional accuracy of 2.5 millimeters within that 25 millimeter range.

Figure 5:
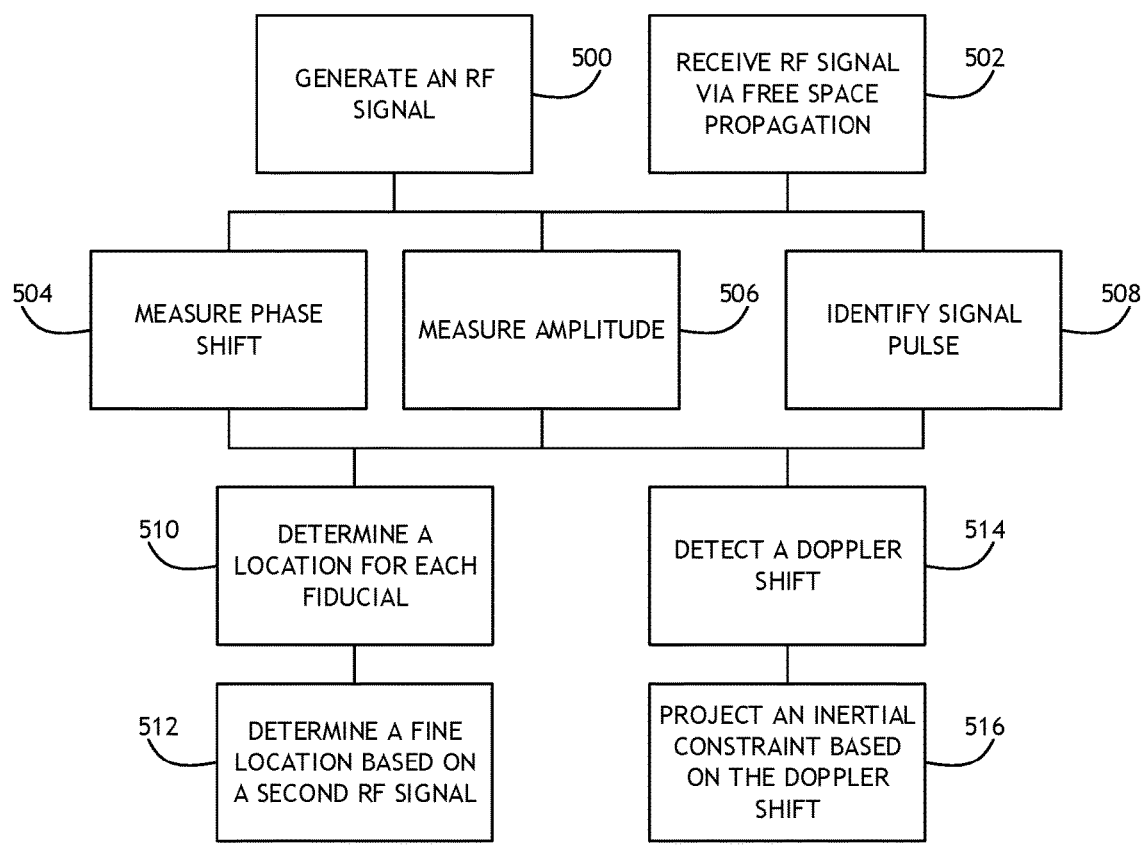
FIG. 5 shows a flowchart of a method for head-tracking according to an exemplary embodiment of the inventive concepts disclosed herein.

Referring to FIG. 5, a flowchart of a method for head-tracking according to an exemplary embodiment of the inventive concepts disclosed herein is shown. In at least one embodiment, a computer system generates 500 one or more RF signals and transmits those RF signals within a target environment. The one or more RF signals are received 502 via free space propagation within the environment. The signals may originate from fiducials on a helmet and be received by RF antennas disposed in the environment, or the signals may originate from RF sources disposed in the environment and be received by fiducials on the helmet.

In one embodiment, the computer system measures 504 phase shift between the generated (500) RF signal and the received (502) RF signal; the phase shift is a measure of the location along a single wavelength where the receiving element is located. Alternatively, or in addition, the computer system measures 506 amplitude and determines a location based on a comparison of the amplitude of the signal where it is received in relation to the reference signal.

In at least one embodiment, the generated 500 signal comprises a pulse. The computer system identifies 508 the pulse and determines 510 a location based on a time disparity between the pulse being transmitted and the pulse being received.

In some embodiments, Global Positioning System (GPS) type algorithms may be used to determine 510 a head pose where the RF sources are analogous to a constellation of GPS satellites. Each fiducial may then be located with reference to a plurality of RF sources; multiple fiducials, each having a known relative location to the others, may be used to determine an orientation of the helmet. Such methodology is applicable when the helmet mounted fiducials comprise the RF receivers; likewise, inverse GPS-like position/orientation determination may be used where the helmet mounted fiducials comprise the RF sources.

In at least one embodiment, a two-stage process is employed where a first RF signal is used to determine 510 a coarse location for each fiducial, and a second RF signal is used to determine a fine location within one second-signal wavelength of the determined coarse location.

In at least one embodiment, received signals are tracked over time (or over sample cycles) to detect 514 Doppler shift indicative of movement in a certain direction. In one embodiment, the detected Doppler shift (which defines a velocity) may be integrated to produce a relative location. Furthermore, changes in the Doppler shift velocity over time (e.g. acceleration) may be used to project 516 a future location or range of locations based on the potential for inertial change. That is to say, movement in a certain direction cannot be instantly halted, therefore future locations may be constrained within a certain distance of the last measured position based on inertia.

In some embodiments, the electric and magnetic field components of the RF signals may be employed for magnetic or electric head-tracking techniques, either for head-tracking calculations or to supplement the other techniques disclosed herein. Such techniques may require magnetic mapping of the cockpit.

Propagation medium differences may be considered during the relevant time and phase delay calculations. Such differences are generally predictable. Transmission effects through the helmet and the pilot may also be considered. The computer system may also need to account for external RF signal interference, and the affects of the RF signals on aircraft systems.

A head-tracking system according to the inventive concepts disclosed herein may be faster, more accurate and require less processing power as compared to optical or magnetic head-tracking.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A head-tracking computer apparatus comprising:
   one or more radio frequency (RF) sources disposed on a helmet; a plurality of RF receivers disposed on surfaces of an operating environment;
   at least one processor in data communication with the one or more RF sources, one or more RF receivers, and a memory storing processor executable code for configuring the at least one processor to:
      generate two or more radio frequency (RF) signals, at least one comprising a low frequency RF signal and at least one comprising a high frequency RF signal;
      apply the two or more RF signals to the one or more RF sources;
      receive the two or more RF signals via the plurality of RF receivers;
      determine a coarse location based on a disparity between the low frequency RF signals as generated and as received via the RF receivers;
      determine a fine location based on a disparity between the high frequency RF signals as generated and as received via the RF receivers; and
      combine the coarse location and fine location to determine a final location,
   wherein:
      the low frequency RF signals comprise a wavelength that is no more than a maximum deviation of the helmet within the operating environment; and the high frequency RF signal comprise a wavelength such that multiple wavelengths fit within the maximum deviation of the head being tracked.

2. The head-tracking computer apparatus of claim 1, wherein the processor executable code further configures the at least one processor to:
   track the two or more RF signals over multiple sampling cycles; determine a Doppler shift for the two or more RF signals; and determine a velocity based on the Doppler shift,
   wherein determining the location comprises integrating the determined velocity.

3. The head-tracking computer apparatus of claim 1, wherein determining the location comprises:
   measuring a phase of the two or more RF signals at each of the plurality of RF receivers; and
   determining a relative location of each RF receiver based on the measured phase of the two or more RF signals.

4. The head-tracking computer apparatus of claim 3, wherein the processor executable code further configures the at least one processor to determine an orientation of the helmet based on determined locations of each RF source as compared a known relative location of each RF source with respect to each other RF source.

5. The head-tracking computer apparatus of claim 1, wherein determining the location comprises:
   measuring an amplitude of the two or more RF signals at each of the plurality of RF receivers; and
   determining a relative location of each RF receiver based on the measured amplitude of the two or more RF signals.

6. The head-tracking computer apparatus of claim 1, wherein determining the location comprises:
   measuring a signal pulse of the two or more RF signals at each of the plurality of RF receivers; and
   determining a relative location of each RF receiver based on a delay in receiving the signal pulse.

7. A method for head-tracking comprising: generating two or more radio frequency (RF) signals, at least one comprising a low frequency RF signal and at least one comprising a high frequency RF signal;
   applying the two or more RF signals to one or more RF sources; receiving the two or more RF signals via a plurality of RF receivers;
   determining a coarse location based on a disparity between the low frequency RF signals as generated and as received via the RF receivers;
   determining a fine location based on a disparity between the high frequency RF signals as generated and as received via the RF receivers; and
   combining the coarse location and fine location to determine a final location,
   wherein:
      the low frequency RF signals comprise a wavelength that is no more than a maximum deviation of a head being tracked as defined by an operating environment; and the high frequency RF signal comprise a wavelength such that multiple wavelengths fit within the maximum deviation of the head being tracked.

8. The method of claim 7, further comprising:
tracking the two or more RF signals over multiple sampling cycles; determining a Doppler shift for the two or more RF signals; and determining a velocity based on the Doppler shift,
wherein determining the location comprises integrating the determined velocity.

9. The method of claim 7, wherein determining the location comprises:
measuring a phase of the two or more RF signals at each of the plurality of RF receivers; and
determining a relative location of each RF receiver based on the measured phase of the two or more RF signals.

10. The method of claim 9, further comprising determining an orientation of the head being tracked based on the determined locations of each RF receiver as compared a known relative location of each RF receiver with respect to each other RF receiver.

11. The method of claim 7, wherein determining the location comprises:
measuring an amplitude of the two or more RF signals at each of the plurality of RF receivers; and
determining a relative location of each RF receiver based on the measured amplitude of the two or more RF signals.

12. The method of claim 7, wherein determining the location comprises:
measuring a signal pulse of the two or more RF signals at each of the plurality of RF receivers; and
determining a relative location of each RF receiver based on a delay in receiving the signal pulse.

13. An aircraft comprising:
one or more radio frequency (RF) sources disposed in a cockpit of the aircraft;
a plurality of RF receivers disposed on a helmet;
at least one processor in data communication with the one or more RF sources, one or more RF receivers, and a memory storing processor executable code for configuring the at least one processor to:
generate two or more radio frequency (RF) signals, at least one comprising a low frequency RF signal and at least one comprising a high frequency RF signal;
apply the two or more RF signals to the one or more RF sources;
receive the two or more RF signals via the plurality of RF receivers; and
determine a coarse location based on a disparity between the low frequency RF signals as generated and as received via the RF receivers;
determine a fine location based on a disparity between the high frequency RF signals as generated and as received via the RF receivers; and
combine the coarse location and fine location to determine a final location,
wherein:
the low frequency RF signals comprise a wavelength that is no more than a maximum deviation of the helmet within the operating environment; and
the high frequency RF signal comprise a wavelength such that multiple wavelengths fit within the maximum deviation of the head being tracked.

14. The aircraft of claim 13, wherein determining the location comprises:
measuring a phase of the two or more RF signals at each of the plurality of RF receivers; and
determining a relative location of each RF receiver based on the measured phase of the two or more RF signals.

15. The aircraft of claim 14, wherein the processor executable code further configures the at least one processor to determine an orientation of the helmet based on determined locations of each RF receiver as compared a known relative location of each RF receiver with respect to each other RF receiver.

16. The aircraft of claim 13, wherein determining the location comprises:
measuring an amplitude of the two or more RF signals at each of the plurality of RF receivers; and
determining a relative location of each RF receiver based on the measured amplitude of the two or more RF signals, compared to a reference RF signal.

17. The aircraft of claim 13, wherein determining the location comprises:
measuring a signal pulse of the two or more RF signals at each of the plurality of RF receivers; and
determining a relative location of each RF receiver based on a delay in receiving the signal pulse.

* * * * *